Dec. 20, 1960

N. W. BELL 2,965,769

TRANSISTOR SWITCH

Filed June 15, 1956

2 Sheets-Sheet 1

INVENTOR.
NORTON W. BELL
BY
Christie, Parker & Hale
ATTORNEYS

Dec. 20, 1960 N. W. BELL 2,965,769

TRANSISTOR SWITCH

Filed June 15, 1956

2 Sheets-Sheet 2

INVENTOR.
NORTON W. BELL

BY

Christie, Parker & Hale
ATTORNEYS

United States Patent Office 2,965,769

Patented Dec. 20, 1960

2,965,769

TRANSISTOR SWITCH

Norton W. Bell, Monrovia, Calif., assignor, by mesne assignments, to Consolidated Electrodynamics Corporation, Pasadena, Calif., a corporation of California Filed June 15, 1956, Ser. No. 591,614

8 Claims. (Cl. 307—88.5)

This invention relates to transistor circuits and more particularly to signal transfer circuits including semi-conductor current flow control means to switch, sample or modulate an electrical current.

A transistor includes a body of semi-conductive material, for example, germanium or silicon. Generally, there are three connections to the semi-conductive body which are designated as the base, the emitter, and the collector. Depending on the particular impurities added to the germanium or silicon, conduction occurs as a result of the movement of "holes" or "electrons" which constitute the carrier of current. If conduction is by movement of "electrons," conductivity is said to be N-type; if conduction is by movement of positive "holes," conduction is said to be of the P-type.

In the consideration of the transistor as a switch or a modulator, the characteristics of particular interest are the open impedance and the closed impedance. The open and closed impedances of the transistor are expressible in terms of easily measurable transistor parameters. For the ideal transistor switch, these parameters are the saturation currents of the emitter and collector junctions and the normal and inverted alphas; the normal alpha being the ratio of the change in collector current to the change in emitter current for current flow from the emitter to the collector, and the inverted alpha being the ratio of the change in emitter current to the change in collector current for current flow from the collector to the emitter. In the open condition in an ideal switch, no current flows through the switch regardless of the voltage applied between the terminals, while in the closed condition no voltage appears across the switch regardless of the current passed. Ideally, the current passed by the switch in the closed condition should be substantially the same as that which would flow through a short circuit, and the current passed in the open circuit condition should be negligible.

When a switch is utilized for certain purposes, such as for the conversion of small direct currents which are difficult to amplify to alternating currents of sufficient magnitude to permit amplification, the open impedance-closed impedance ratio should be as large as possible. Spurious signals introduced by the switch when closed or opened, and differences in the parameters of each switch, if a plurality of switches are utilized, must be compensated for.

The circuits disclosed herein provide a higher open condition resistance than previously obtained without affecting the low closed resistance. By increasing the open circuit condition impedance without substantially affecting the closed circuit condition impedance, a higher open impedance-closed impedance ratio is obtained than formerly obtainable. As a result of this higher ratio, a larger variation in an alternating current voltage can be obtained. Therefore, if the disclosed electrical circuits are utilized in conjunction with a direct current from a small direct current signal source, such as a strain gauge, the alternating current output signal is easily amplified by conventional amplifying methods.

A disadvantage of the use of transistors as switching elements is the fact that the resistance of the transistor decreases exponentially as the temperature increases. Many transistor switches cannot be utilized effectively at temperatures even as low as 60° C. because the open circuit condition impedance is not great enough for proper operation in some circuits. With the use of the herein disclosed new electrical switching circuits, however, with its much greater open circuit condition impedance, the impedance is large enough even at higher temperatures for the switching circuits to operate effectively. By the use of my new electrical switching circuit, transistors which normally would be unusable at temperatures of 60° C. or higher, can now be utilized with temperatures in the higher temperature ranges.

The aforementioned disadvantages of many transistor switching circuits are overcome to a large degree by including in a switching circuit means for reverse biasing both the emitter-base junction and the base-collector junction. If desired, the means for reverse biasing both of the junctions may include an impedance such as a resistance which is connected in parallel with the transistor utilized. Reverse biasing signals from an electrical signal source, which are fed to the parallel arrangement of the transistor and impedance, will bias the emitter and the collector in the same direction with respect to the base. The resistance has negligible effect on the circuit when the transistor is forward biased.

The inclusion of the impedance means connected in parallel with the transistor provides a very high open circuit condition impedance without substantially increasing the low closed circuit condition impedance. The open circuit high impedance retains sufficient magnitude at high temperature to enable operation at relatively high temperatures without changing the composition of a transistor which formerly could be utilized only in a limited lower temperature range.

The invention and its many advantages will be better understood when considered in conjunction with the accompanying drawings, in which.

Figure 1:
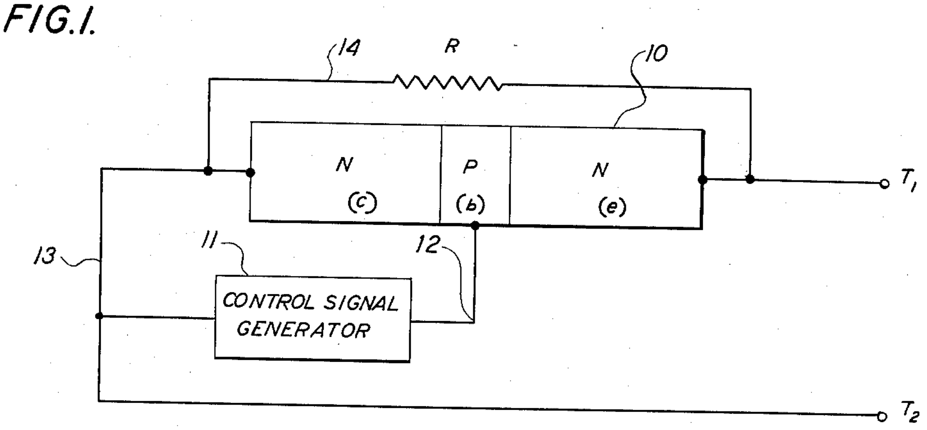
Fig. 1 is a block and schematic diagram of a preferred embodiment of the invention utilizing one transistor.

Referring to the drawings, and particularly to Fig. 1, a transistor electrical circuit is shown utilizing an NPN type transistor 10. The transistor 10 consists of two portions of semi-conductive material of the N type, with the N type portions of semi-conductive material being separated by a section of semi-conductive material of the P conductivity type. The area of semi-conductive material P provides a barrier between the N type portions. Current flow is from one N type semi-conductive material through the P type material to the second N type semi-conductive material. The current flow is usually from the semi-conductive material called the emitter to the semi-conductive material called the collector, with the magnitude of the current being controlled by the barrier or base P provided between the two N portions of semiconductive material. In Fig. 1 the emitter is designated by (*e*), the collector by (*c*), and the base by (*b*), which is the preferred embodiment. However, if desired, the emitter (*e*) and the collector (*c*) may be reversed in position.

Connected between the base (*b*) and the collector (*c*) is a means for applying an electrical signal to the collector, such as a control signal generator 11. The control signal generator 11 is shown connected between a lead 12 to the base and a lead 13 to the collector.

To provide for the reverse biasing of the emitter-base junction, an impedance means such as the resistor R may be connected in parallel with the transistor 10. Hence, reverse bias signals conducted through lead 13 are also conducted through the shunt lead 14 and resistor R to the emitter. The reverse bias signal is therefore applied to both junctions, and both junctions are biased in the reverse bias direction, resulting in high resistance to current flow. Resistance R has practically no effect on forward bias conditions.

Figure 2:
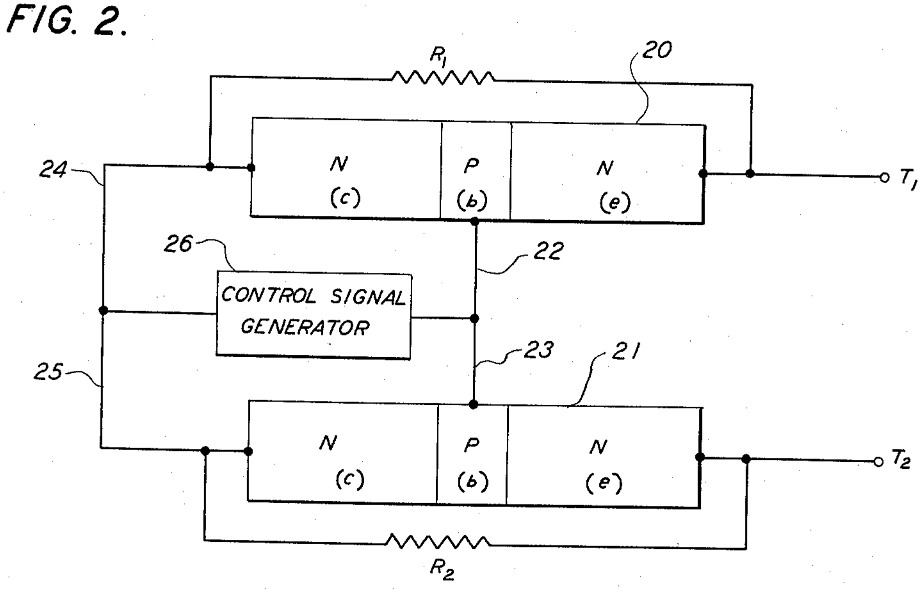
Fig. 2 is a block and schematic diagram showing a preferred embodiment of the invention utilizing two transistors connected in series.

Fig. 2 shows a preferred form of my new transistor switch utilizing two NPN transistors 20 and 21 which are connected in series. The base of transistor 20 is coupled to the base of transistor 21 by leads 22 and 23. Bias voltages are applied to the collector of each of the transistors 20 and 21 from the control signal generator 26 which is connected between the coupled bases of transistors 20 and 21 and the collectors of transistors 20 and 21 through leads 24 and 25. In this embodiment, a resistance $R_1$ is connected in parallel with the transistor 20 and a resistance $R_2$ is connected in parallel with the transistor 21. The control signal generator provides a signal source for signals which are utilized to reverse bias both of the PN junctions in each transistor 20 and 21 through resistors $R_1$ and $R_2$, the resistors $R_1$ and $R_2$ having practically no effect when a forward bias signal is applied.

The embodiment of my transistor switch shown in Fig. 2 is particularly desirable for switching low level signals because (1) the resistors $R_1$ and $R_2$ are arranged to provide a very high open circuit impedance, and (2) the transistors 20 and 21 are connected across the terminals $T_1$ and $T_2$ to provide a zero or negligible spurious potential across the terminals when the circuit is in its closed condition. It is well known that a saturation voltage is developed across a transistor when it is operated in the closed or on condition (e.g., as a low impedance to current flow). This saturation voltage appears as a spurious potential which may invalidate measurements of currents from low level signal sources when the transistor is used as a switch as in Fig. 1. In the circuit of Fig. 2 (and Fig. 4) the transistors 20 and 21 are connected across the terminals $T_1$ and $T_2$ in such a manner that the spurious potentials or saturation voltages developed across the transistors when the control signal generator is biasing the collector-base junctions in the forward direction are opposite polarity and tend to cancel, thereby providing a zero or extremely small net spurious voltage across the terminals $T_1$ and $T_2$ in the closed circuit condition. This phenomenon is explained in more detail in the application Serial No. 454,060, filed September 3, 1954, which issued as Patent No. 2,891,171 and is assigned to the same assignee. The polarity of the saturation voltage developed across a transistor when employed as a switching device in a circuit such as Fig. 2 (wherein only one junction is biased in the forward direction by an external signal generator) is dependent upon the type of transistor and the junction that is biased by the signal generator. For example, in Fig. 2 the polarity of the saturation voltage is negative at the collector electrodes and positive at the emitter electrodes of each transistor due to the negative potential applied to the collector electrodes and the positive potential applied to the base electrodes by the signal generator 26 to forward bias the collector-base junctions. Obviously, the saturation voltages are of opposite polarity when considered around the loop between terminals $T_1$ and $T_2$.

The saturation current of the reverse bias current to the emitter is determined by the formula $$I_e=\frac{I(1-a_n)}{(1-a_r a_n)} \qquad (1)$$

where I is the saturation current of the base-emitter junction with zero collector current, $a_n$ is the transistor current gain of current flow from the emitter to the collector, and $a_r$ is the transistor current gain of current flow from the collector to the emitter. See the article in "Proceedings of the IRE," volume 42, December 1954, entitled "Large-Signal Behavior of Junction Transistors" by J. J. Ebers and J. L. Moll.

The maximum value of the resistor then is about $$V\frac{(1-a_n a_r)}{I(1-a_n)} \qquad (2)$$

where V is the reverse bias voltage.

In the operation of my new transfer circuits, when the control signal generator provides a signal which causes the collector and the emitter to be of negative potential with respect to the base, the low resistance condition exists. Current passed between terminals $T_1$ and $T_2$ through lead 13, if one transistor is utilized, or through leads 24 and 25, if two transistors are utilized, is relatively high. When the control signal generator provides a signal which causes the collector and the emitter to be of positive potential with respect to the base, the high resistance condition exists, and current through lead 13 of Fig. 1 or leads 24 and 25 of Fig. 2 is negligible.

Figure 3:
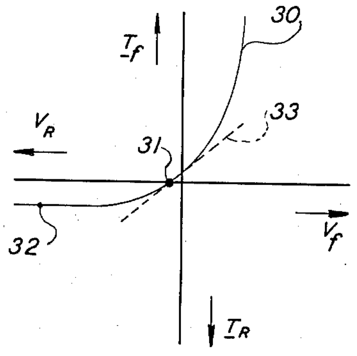
Fig. 3 is a graphical illustration of some of the advantages obtainable utilizing my new electrical circuit as compared to conventional transistor switching means.

Fig. 3 is a graphical representation of the emitter junction voltage-current relation with the collector junction biased in the reverse direction with more than 0.1 volt. Curve 30 represents the voltage-current curve with 31 and 32 indicating the operating points without the inclusion of the impedance R and with the impedance $R_1$, respectively. Dashed line 33 drawn to point 31 indicates the slope of curve 30 at operating point 31. Since the $$\text{resistance}=\frac{dV_R}{dI_R}$$

line 33 indicates the open circuit resistance without the inclusion of impedance $R_1$ which is a finite resistance. The resistance at operating point 32, however, approaches that of an open circuit. As indicated above, the control signal generator 11 or 26 selectively biases the collector-base junction of the transistor 10 in Fig. 1 or the transistors 20 and 21 in Fig. 2 in the forward or reverse directions. The resistors R, $R_1$, $R_2$, operate in response to the control signal generator 11 or 26 to bias the emitter-base junction of the transistors 10, 21 and 22 in the reverse direction when the collector-base junction of the respective transistors are also biased in a reverse direction. Thus, when the control signal generator 11 or 26 is applying a reverse biasing signal, the impedance across both junctions of each of the transistors is very high.

When the collector-base junctions of the transistors in the circuits of Figs. 1 and 2 are forward biased the emitter-base junctions are floating. The theory of such floating-junction transistor switch circuits is discussed in detail in an article entitled "Small Signal Analysis of Floating-Junction Transistor Switch Circuits," by N. W. Bell, published in the October 1955, IRE Transactions of the Professional Group on Electron Devices (vol. ED–2, No. 4). When employing the circuits of Figs. 1 and 2 as an electrical switch, the control signal generators 11 or 26 may selectively or alternately apply a forward and a reverse biasing signal to the collector-base junction of the respective transistors to establish a very low and a very high impedance respectively between the terminals $T_1$ and $T_2$.

Under many conditions the parameters of one transistor are not the same as like parameters in a second transistor.

Spurious signals arise in the circuit as a result of this dissimilarity. These spurious signals can be represented by a source of voltage in series with the switch and hence can be determined for each electrical switching circuit utilized, and compensated for by the inclusion within the electrical switching circuit of a compensating means.

Figure 4:
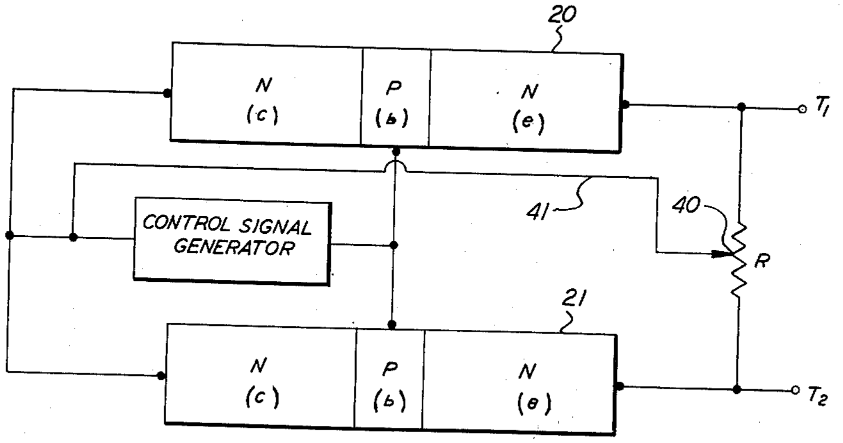
Fig. 4 is a block and schematic diagram showing an embodiment of the invention which includes means for compensating for differences in saturation current between the two transistors.

Fig. 4 shows an embodiment substantially the same as that shown in Fig. 2 wherein like numerals refer to like parts. Included in the embodiment of Fig. 4, however, is a potentiometer arrangement represented by the resistor R having a movable tap 40 which is coupled to the control signal generator through lead 41. By adjusting the position of the tap 40, the amount of bias voltage applied to the emitter of each of the transistors 20 and 21 can be adjusted to correct for the spurious voltages caused by the differences in parameters of each transistor.

Figure 5:
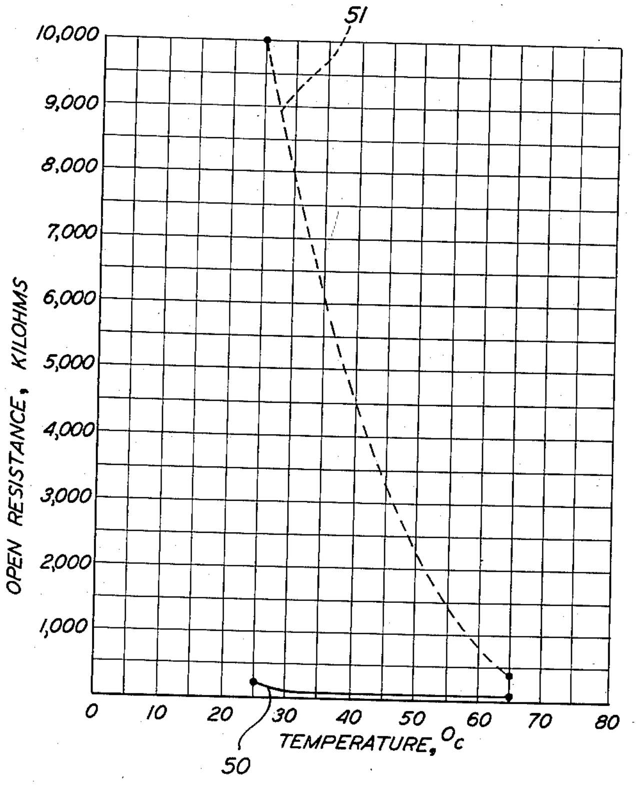
Fig. 5 is a graphical representation showing clearly the higher open circuit impedance obtained by my new electrical transistor switching means than obtained formerly.

Fig. 5 is an approximate graphical representation of an open circuit resistance-temperature curve for an alloyed or diffused-junction transistor. The transistor has a reverse saturation current of $3\times10^{-6}A$ at room temperature; an $a_n=.9$, and an $a_r=.5$. The solid line 50 is an approximate curve obtained utilizing the diffused-junction transistor without the inclusion of my new means for reverse biasing both of the PN junctions of each transistor. The dashed curve 51 is obtained using the same diffused-junction transistor but including therein the proper value of resistance for reverse biasing both of the PN junctions. Fig. 5 clearly shows the much higher open circuit condition resistance obtainable utilizing my new electrical switching circuit as compared with former switching circuits. Note that even at a temperature as high as 65° C. the resistance of my new electrical switching circuit is sufficiently high to enable efficient operation, whereas curve 50 indicates that switching circuits using the same transistor but which do not utilize the parallel connected resistor have become inefficient for most purposes.

Although in the specific embodiment of the invention described the transistor is of NPN configuration, it will be understood that junction transistors of PNP configuration may be utilized, appropriate changes being made, of course, in the polarities of the biasing source or sources.

I claim:

1. In a switching circuit for selectively establishing a very high or a very low impedance between two terminals, the combination which comprises a junction transistor having a first and second portions of semi-conductive material of one conductivity type and a third portion of semi-conductive material of the opposite conductivity type separating the first and second portions for forming a first junction between the first and third portions and a second junction between the second and third portions, conducting means connected between the first portion and one of the terminals, conducting means connected between the second portion and the other terminal, control signal generating means connected between the first and third portions for alternately biasing the first junction in the reverse and forward directions and a resistor connected between the first and second portions for biasing the second junction in the reverse direction when the first junction is biased in the reverse direction and for permitting the second portion to follow the voltage of the third portion when the first junction is biased in the forward direction, the resistor having a very high impedance so that the resistor will have substantially no effect on the impedance between the two terminals when the first and second junctions are biased in the reverse direction.

2. In a switching circuit for selectively establishing a very high or a very low impedance between two terminals, the combination which comprises first and second junction transistors, each of the transistors having first and second portions of semi-conductive material of one conductivity type and a third portion of semi-conductive material of the opposite conductivity type separating the first and second portions, means for connecting the first portion of the first transistor to one of the terminals, means for connecting the first portion of the second transistor to the other terminal, means connected between the third portion of each of the transistors, control signal generating means connected between the second and third portions of each of the transistors for selectively biasing the junction between the second and third portions of each of the transistors in the forward or reverse directions, and means coupled individually to the first portion of each of the transistors and responsive to the control signal generating means for biasing the junctions between the first and second portions of each of the transistors in the reverse direction when the control signal generating means applies a reverse biasing potential to the junctions between the second and third portions of each of the transistors.

3. The combination as defined in claim 2 wherein the last named means is a resistor coupled individually between the first and second portions of each of the transistors.

4. In a signal translating circuit the combination which comprises first and second terminals, a pair of junction transistors, each of the transistors including base, collector and emitter electrodes, control signal generating means connected between the base and collector electrodes of each of the transistors for alternately biasing the collector-base junctions of each of the transistors in the forward and reverse directions, resistance means coupled individually between the emitter and collector electrode of each of the transistors, the resistance means being arranged to pass sufficient current when the control signal generating means is applying reverse bias to the collector-base junctions of the transistors to drive the emitter-base junctions of each of the transistors into the high impedance reverse biased region and to present a high impedance to current flow between the emitter and collector electrodes of each of the transistors when the collector-base junctions of the transistors are biased in the reverse direction, direct current conductive means connected between the emitter electrode of one of the transistors and the first terminal, direct current conductive means connected between the emitter electrode of the other transistor and the second terminal, and direct current conductive means connected between the collector electrodes of each of the transistors.

5. The combination as defined in claim 4 wherein the maximum impedance of the resistance means is approximately equal to $$\frac{V(1-a_n a_r)}{I(1-a_n)}$$

where V is the reverse bias voltage, I is the saturation current of the base-collector junction with zero emitter current, $a_n$ is the transistor current gain of current flow from the emitter to the collector, and $a_r$ is the transistor current gain of current flow from the collector to the emitter.

6. The combination as defined in claim 4 wherein the resistance means is a potentiometer including two end terminals and a moveable intermediate tab, the end terminals being connected to the emitter electrodes of the respective transistors and the intermediate tab of the potentiometer being connected to the collector electrodes of the transistors.

7. In a switching circuit for selectively establishing a very high or a very low impedance between two terminals, the combination which comprises a pair of junction transistors, each of the transistors having first and second junctions, control signal generating means coupled to each of the first junctions for alternately biasing the first junction of each transistor in the forward and reverse direction, a resistor individually coupling the control signal generating means across each of the second junctions for biasing the second junction of each transistor in the reverse direction when the first junctions are biased in the reverse direction by the control signal generating means and for permitting each of the second junctions to follow the voltage of the first junction of the respective transistor when the first junctions are biased in the forward direction, direct current conductive means connecting the transistors in series between the two terminals so that the spurious potentials developed across each of the transistors when the control signal generating is biasing the first junctions in the forward direction will be of opposite polarity and produce a net spurious potential across the terminals that is the difference between the spurious potentials developed across each transistor.

8. In a switching circuit for selectively establishing a very high or a very low impedance between two terminals, the combination which comprises a pair of junction transistors, each of the transistors having a base, an emitter and a collector electrode and first and second junctions, means coupled to each of the first junctions for alternately biasing the first junction of each transistor in the forward and reverse direction, means individually connected between the emitter and collector electrodes of each transistor for biasing the second junction of each transistor in the reverse direction when the first junctions are biased in the reverse direction and for permitting each of the second junctions to follow the voltage of the first junction of respective transistor when the first junctions are biased in the forward direction, said last named means providing a high impedance to current flow when the first junctions are biased in the reverse direction to have substantially no effect on the impedance between the two terminals, direct current conductive means connecting the transistors between the two terminals to subtract the spurious potentials developed across each of the transistors when the first junctions are biased in the forward direction, whereby the net spurious potential developed across the terminals is the difference between the individual spurious potentials developed across each of the transistors.

References Cited in the file of this patent

UNITED STATES PATENTS

| | | |
|---|---|---|
| 2,533,001 | Eberhard | Dec. 5, 1950 |
| 2,644,892 | Gehman | July 7, 1953 |
| 2,722,649 | Immel et al. | Nov. 1, 1955 |
| 2,773,132 | Bright | Dec. 4, 1956 |
| 2,774,888 | Trousdale | Dec. 18, 1956 |
| 2,776,382 | Jensen | June 1, 1957 |
| 2,780,725 | Johanson | Feb. 5, 1957 |
| 2,795,762 | Sziklai | June 11, 1957 |

FOREIGN PATENTS

| | | |
|---|---|---|
| 539,781 | Italy | Feb. 22, 1956 |

OTHER REFERENCES

Pub. II Electronics, April 1954, article by Cheng, pp. 191, 192, 194.

Article: "Junction Transistors Used as Switches," by R. L. Bright, AIEE Transactions, vol. 74, part I, March 1955, pages 111–121.

UNITED STATES PATENT OFFICE

CERTIFICATION OF CORRECTION

Patent No. 2,965,769 December 20, 1960

Norton W. Bell

It is hereby certified that error appears in the above numbered patent requiring correction and that the said Letters Patent should read as corrected below.

Column 3, line 33, for "signal", second occurrence, read -- single --.

Signed and sealed this 20th day of June 1961.

(SEAL)
Attest:

ERNEST W. SWIDER
Attesting Officer

DAVID L. LADD
Commissioner of Patents